C. RUGGABER.
ATTACHMENT FOR TROLLEY POLES.
APPLICATION FILED MAY 28, 1908.
904,363.
Patented Nov. 17, 1908.
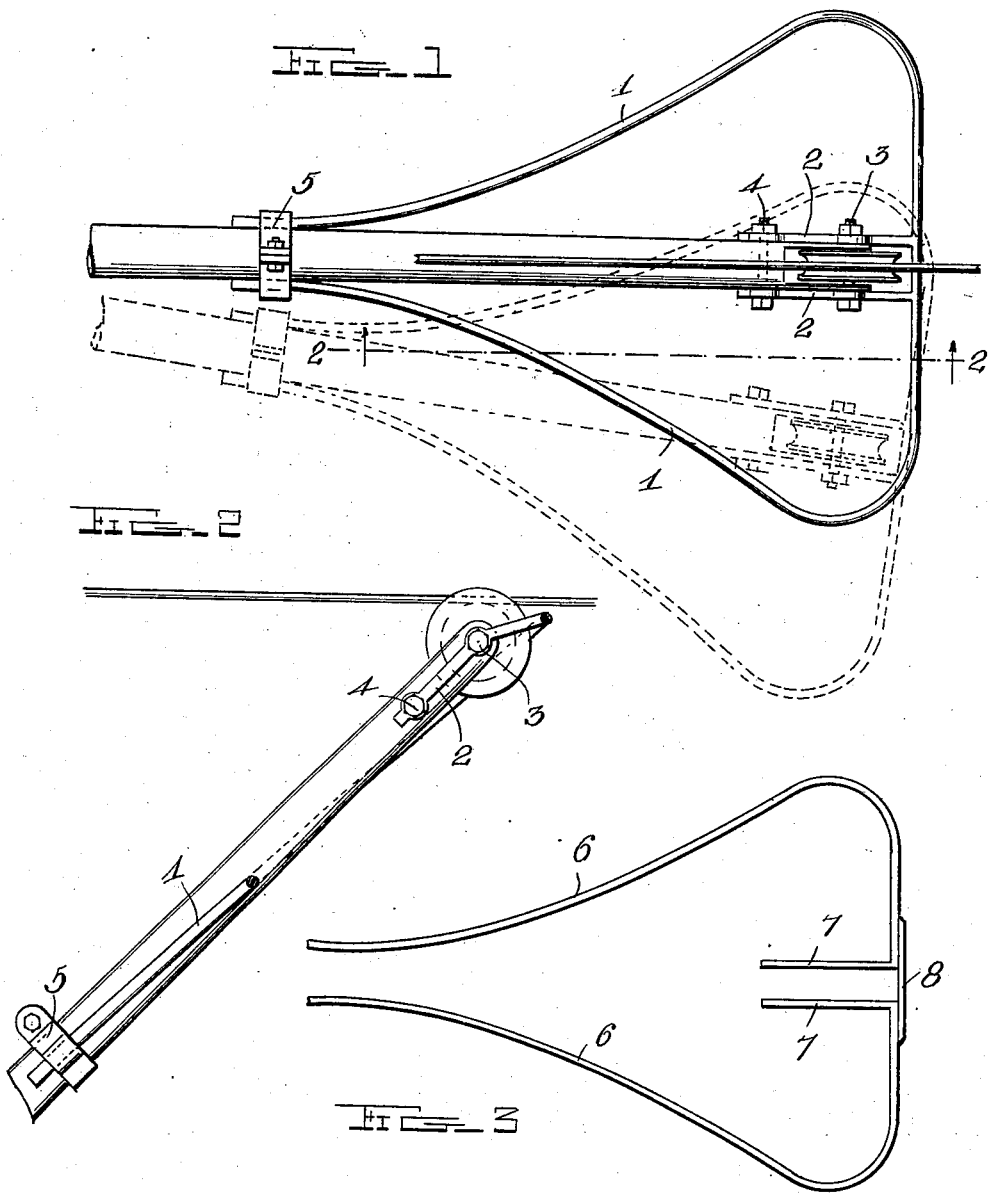
Witnesses
C. H. Griesbauer.
Inventor
Constantin Ruggaber
By H. B. Willson & Co.
Attorneys

UNITED STATES PATENT OFFICE.

CONSTANTIN RUGGABER, OF BUFFALO, NEW YORK.

ATTACHMENT FOR TROLLEY-POLES.

No. 904,363.  Specification of Letters Patent.  Patented Nov. 17, 1908.

Application filed May 28, 1908. Serial No. 435,585.

*To all whom it may concern:*

Be it known that I, CONSTANTIN RUGGABER, a citizen of the United States, residing at Buffalo, in the county of Erie and State of New York, have invented certain new and useful Improvements in Attachments for Trolley-Poles; and I do declare the following to be a full, clear, and exact description of the invention, such as will enable others skilled in the art to which it appertains to make and use the same.

This invention relates to improvements in wire-engaging attachments for trolley poles.

The object of the invention is to provide an attachment of this character by means of which a trolley pole is prevented from entirely leaving the trolley wire, and by means of which an electrical connection will be had with the trolley wire, even though the trolley wheel has become disengaged therefrom as frequently occurs when a car is passing around sharp curves, or when passing over railway grade crossings, thus avoiding endangering the lives of the passengers in the car, which would happen should the trolley leave the track and the car stop on the crossing.

With this and other objects in view, the invention consists of certain novel features of construction, combination and arrangement of parts as will be described and particularly pointed out in the appended claims.

In the accompanying drawings, Figure 1 is a plan view of the upper end of a trolley pole and the trolley wheel, showing the application of the invention thereto and showing in dotted lines the manner in which the attachment engages the trolley wire when the wheel has left the same in rounding curves; Fig. 2 is a sectional view of the same on the line 2—2 of Fig. 1; and Fig. 3 is a plan view of a modified construction of the invention removed from the trolley pole.

In the embodiment of the invention I provide a frame, 1, preferably formed of wire bent into substantially triangular shape as shown. The base of the triangular shaped frame 1 is provided at its central portion with inwardly-projecting, right-angularly formed attaching lugs or arms, 2, which are adapted to be secured to the outer end of the trolley pole by means of a bolt, 3, which forms the axle of the trolley wheel. The arms 2 may be extended and further secured by a second bolt, 4, if desired. The inner ends of the triangular frame 1 are bolted or otherwise secured to the opposite sides of the trolley pole as shown at 5, thus securely fastening the frame in place and into electrical engagement with the end of the pole. It will be noted that a portion of the base of the frame bridges the space between the bifurcated ends of the pole in which the trolley wheel is mounted so that should said trolley wheel become broken or drop out of position in the end of the pole, said bridge portion of the frame will engage the trolley wire and thus continue the electrical connection between the pole and the wire.

By providing a frame constructed as herein shown and described, an electrical engagement will be maintained between the pole and wire should the trolley wheel become disengaged therefrom as frequently occurs when the car is passing around curves, the shape of the frame being such that no matter how sharp the turn may be, the frame will still remain engaged with the trolley wire. The different positions at which the frame may be engaged with the wire are illustrated in dotted lines in Fig. 1 of the drawing.

In Fig. 3 is shown a slightly modified arrangement of the frame, the same being shown in this instance as formed in two sections, 6, the outer ends of which are bent at right-angles to form the pole-engaging arms, 7, for the base or outer portion of the frame and which take the place of the arms, 2, shown in Fig. 1, said arms 7 being bolted to the pole in the same manner as described in connection with the arms 2. In the latter form of frame, the two sections 6 are connected by a bridge piece, 8, which is welded or otherwise secured thereto adjacent to the inwardly bent arms on the base portion of the sections to bridge the space between the bifurcated end of the trolley pole.

An attachment of this character constructed as herein shown and described is simple, strong, durable and inexpensive and may be readily applied to any form of trolley pole and will effectually prevent the disconnection of the pole from the wire.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In an attachment for trolley poles, a frame having inner ends bolted to the opposite sides of the pole, attaching arms on the base portion of the frame adapted to engage the opposite sides of the outer end of the pole, a combined bolt and trolley wheel axle adapted to secure said arms to the end of the pole, said frame having means to close the space between the bifurcated end of the pole, substantially as described.

2. In an attachment for trolley poles, a frame having its inner ends bolted to the opposite sides of the pole, attaching arms on the base portion of the frame adapted to engage the opposite sides of the outer end of the pole, a combined fastening bolt and trolley wheel axle adapted to secure said arms to the opposite sides of the pole, said frame having an integral portion arranged between said arms to span the space between the bifurcated end of the pole, substantially as described.

In testimony whereof I have hereunto set my hand in presence of two subscribing witnesses.

CONSTANTIN RUGGABER.

Witnesses:
 EDWIN G. HARRIS,
 ALBERT C. KNACK.